(12) United States Patent
Aoyagi et al.

(10) Patent No.: US 6,678,660 B1
(45) Date of Patent: Jan. 13, 2004

(54) RECEIVING BUFFER CONTROLLING METHOD AND VOICE PACKET DECODER

(75) Inventors: Hiromi Aoyagi, Tokyo (JP); Atsushi Shimbo, Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/557,212

(22) Filed: Apr. 25, 2000

(30) Foreign Application Priority Data

Apr. 27, 1999 (JP) .......................................... 11-119730

(51) Int. Cl.[7] ........................... G10L 21/00; G10L 15/20
(52) U.S. Cl. ..................................... 704/270.1; 704/233
(58) Field of Search ............................ 704/270, 270.1, 704/200, 201, 233, 208, 214

(56) References Cited

U.S. PATENT DOCUMENTS 4,864,495 A * 9/1989 Inaba ......................... 370/392
5,644,568 A * 7/1997 Ayerst et al. ............... 340/7.45
5,666,357 A * 9/1997 Jangi ........................... 370/345
5,949,792 A * 9/1999 Yasuda et al. ............... 370/471
6,259,702 B1 * 7/2001 Yamamoto ................... 359/128
2002/0114327 A1 * 8/2002 Mononen ..................... 370/389

\* cited by examiner

Primary Examiner—Richemond Dorvil
Assistant Examiner—Angela Armstrong
(74) Attorney, Agent, or Firm—Rabin & Berdo, P.C.

(57) ABSTRACT

A voice packet decoder has following operations. A receiving buffer stores receiving packets and outputs the oldest packet in every fixed period. When in every the fixed period, if the receiving buffer stores no packets, then a complement packet insert circuit inserts a predetermined complement packet and a counter adds one. Furthermore, a voice decoder generates a synthetic voice signal. A speech/non-speech detection circuit detects whether the synthetic voice signal is speech signal or non-speech signal. When a result of the detecting is non-speech, the counter's value is more than zero, and a number of the stored receiving packets in the receiving buffer is more than one, then a receiving buffer controller discards the oldest packet and subtracts one from the counter's value.

10 Claims, 9 Drawing Sheets

A : output of voice encoder (every 10ms)
B : network
C : status of receiving buffer
    before buffer controlling
D : V value of preceding 10ms
E : status of receiving buffer
    after buffer controlling
F : to voice decoder (every 10ms)
G : value of counter after 10ms ☐ : packet discarding
× : complement packet A : output of voice encoder (every 10ms)
B : network
C : status of receiving buffer
    before buffer controlling
D : V value of preceding 10ms
E : status of receiving buffer
    after buffer controlling
F : to voice decoder (every 10ms)

☐ : packet discarding

× : complement packet

RECEIVING BUFFER CONTROLLING METHOD AND VOICE PACKET DECODER

FIELD OF THE INVENTION

The present invention relates to a packet transmission system for the voice signal information.

BACKGROUND OF THE INVENTION

In a recent packet switched network, for example the inter-net, request of real-time voice communication is an important subject to attain. The real-time voice communication treats encoded voice signal as packetized information for transmitting a network.

Depend on a network condition, delays of voice packets may happen. In that cases, receiving side copes with the delays by inserting complement voice packets instead of the delay packets, for operating voice decoder.

Therefore, The voice communication has some delays, so it will need to discard some receiving packets for recovering the delays.

The present, the discarding is performed without consideration about characters of receiving packets. Hence, it has a possibility that quality of synthetic voice signal is deteriorated.

SUMMARY OF THE INVENTION

It is an object of the invention to provide an improved voice packet decoder for network voice communication which can recover packet delays without deteriorating of a synthetic voice signal quality.

To solve such a problem, a voice packet decoder of the present invention has following operations. A receiving buffer stores a plurality of receiving packets given from a network and outputs the oldest packet in every fixed period as an encoded packet. When in every the fixed period, if the receiving buffer stores no packets, then a complement packet insert circuit inserts a predetermined complement packet and a counter adds one. Furthermore, a voice decoder generates a synthetic voice signal based on the encoded packet. A speech/non-speech detection circuit detects whether the synthetic voice signal is speech signal or non-speech signal. When a result of the speech/non-speech detecting is non-speech, the counter's value is more than zero, and a number of the receiving packets in the receiving buffer stored is more than one, then a receiving buffer controller discards the oldest packet stored in the receiving buffer and subtracts one from the counter's value.

DETAILED DESCRIPTION OF THE PREFERRED EMBODIMENTS (First Embodiment)

Figure 1:
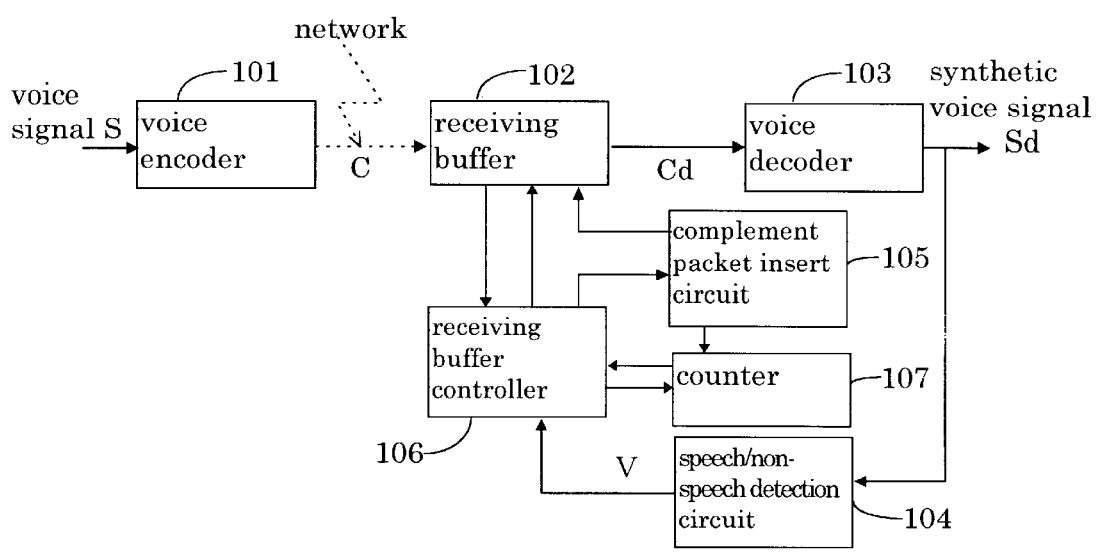
FIG. 1 is a block diagram of first embodiment of this invention.

FIG. 1 shows a construction of a voice packet decoder of the first embodiment. A voice encoder 101 encodes input voice signal S in every 10 ms frame, and outputs encoded packets C. The encoded packets C are transmitted via a network and stored a receiving buffer 102 of the voice packet decoder.

At regular interval or in every 10 ms, the receiving buffer 102 outputs an encoded packet Cd which is the oldest stored packet C, to a voice decoder 103. In every 10 ms, the voice decoder 103 generates synthetic voice signal Sd by decoding the encoded packet Cd which is provided from the receiving buffer 102.

Based on the synthetic voice signal Sd which is provided every 10 ms, a speech/non-speech detection circuit 104 calculates a frame power R.

If the frame power R satisfies following expression (1), the voice signal Sd is determined as a speech signal and the speech/non-speech detection circuit 104 outputs "V=1". If not, the voice signal Sd is determined as a non-speech signal and the speech/non-speech detection circuit 104 outputs "V=0".

$$R > B \times T \tag{1}$$

where B denotes a background noise power and its initial value is zero, T denotes a predetermined constant of speech power threshold and in the embodiment determined as 16.

After the above decision, B is updated as follows.

$$B = \min.(R, \max.(B \times D, B+1))$$

where min. (x, y) denotes a smaller value of x or y, and max. (x, y) denotes a larger value of x or y. Moreover, D denotes a predetermined constant of noise power estimate coefficient and in the embodiment determined as 1.0026.

A receiving buffer controller 106 operates as follows, based on the encoded packets C that are received from the network.

The encoded packets C are stored in order for the receiving buffer 102. Then, receiving buffer 102 outputs stored encoded packets C as Cd in the order of store in every constant periodic 10 ms.

When some kind of network delay has happen and then any encoded packets haven't be stored in the receiving buffer 102, a complement packet insert circuit 105 inserts a complement packet and a counter 107 add one to own stored value where an initial value of the counter 107 is zero. In the embodiment, the complement packet includes predetermined non-speech signal.

In any period, if stored encoded packet number in the receiving buffer 102 is one or more, the preceding period detection of the speech/non-speech detection circuit 104 was "V=0" or a non-speech signal, and the counter 107's value is one or more, then it is large possibility that the oldest stored encoded packet C of the receiving buffer 102 is non-speech signal. So, the receiving buffer controller 106 discards the oldest stored encoded packet C and subtracts one to the counter 107 stored value.

Figure 2:
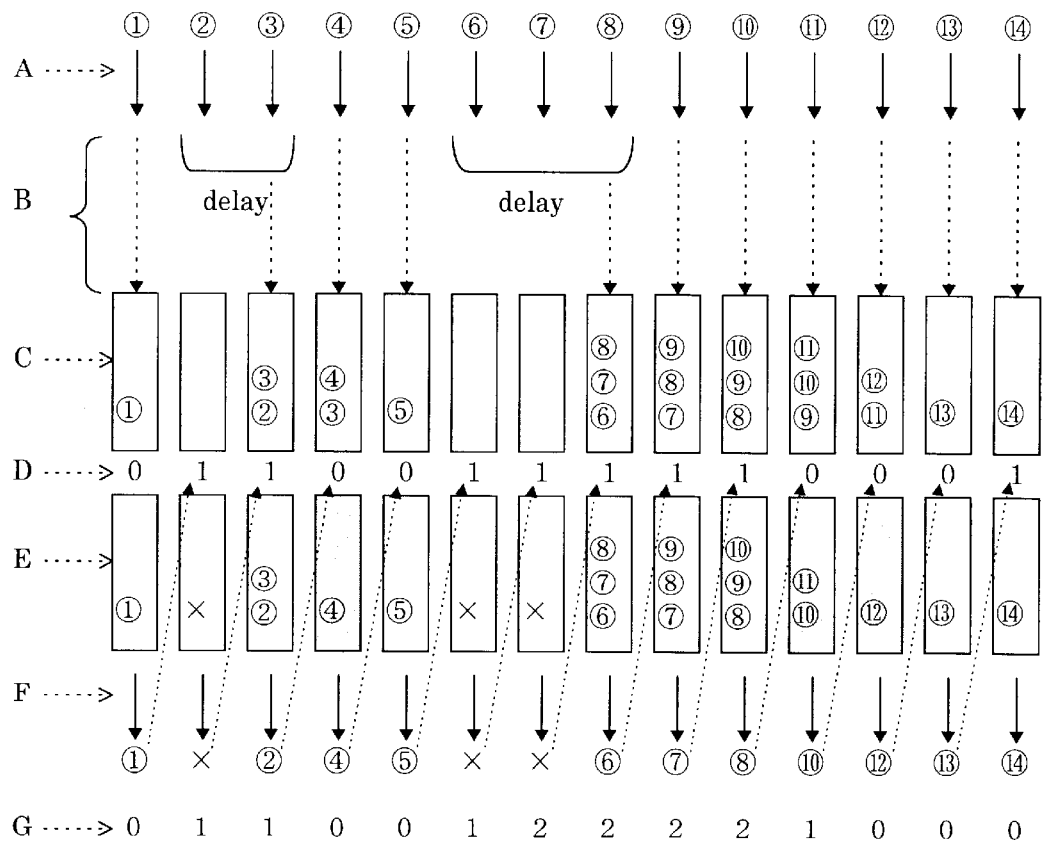
FIG. 2 is an operation chart of the first embodiment's receiving buffer control.

FIG. 2 is a detailed operation chart of the voice packet decoder's receiving buffer control. Encoded packets (1), (2), (3), . . . are transmitted from the voice encoder 101. to the voice packet decoder through the network and stored in the receiving buffer 102 in the order of arrival.

In normal condition, the encoded packets are transmitted in the constant interval of 10 ms. But, some reasons may occur transmission delay of any encoded packet.

For example, the delay of 10 ms occurs on the transmission of the encoded packet (2) (:see section B and C). In this case, the complement packet insert circuit 105 inserts a complement packet "X" (:see section E). Then, the complement packet "X" is provided to the voice decoder 103 (:see section F) and the counter 107 is made one (:see section G).

When the encoded packet (3) is transmitted and stored in the receiving buffer 102, the counter 107 is one. However, because of the preceding period detection of the speech/non-speech detection circuit 104 was "V=1" or a speech signal (:see section D), the receiving buffer controller 106 doesn't discard the oldest stored encoded packet (2). Hence, the encoded packet (2) is provided to the voice decoder 103 and the counter 107 is kept one.

Next, when the encoded packet (4) is transmitted and is stored into the receiving buffer 102, the counter is made one and the value of the preceding 10 ms period detection is "V=0", or non-speech signal, then the oldest stored encoded packet (3) of the receiving buffer 102 is discarded. Then, the value of counter is subtracted and returned to zero.

Moreover, when the encoded packets (6) and (7) are transmitted, a delay of 20 ms happened and two complement packets "X" are outputted consecutively. Therefor, the counter is added twice, so the counter value is made two.

After that, until the counter value becomes zero, when the value of the preceding 10 ms period detection is "V=0", above-mentioned the oldest stored encoded packet discarding process is repeated. Therefore, when the encoded packet (12) is transmitted, delays are dissolved.

Figure 8:
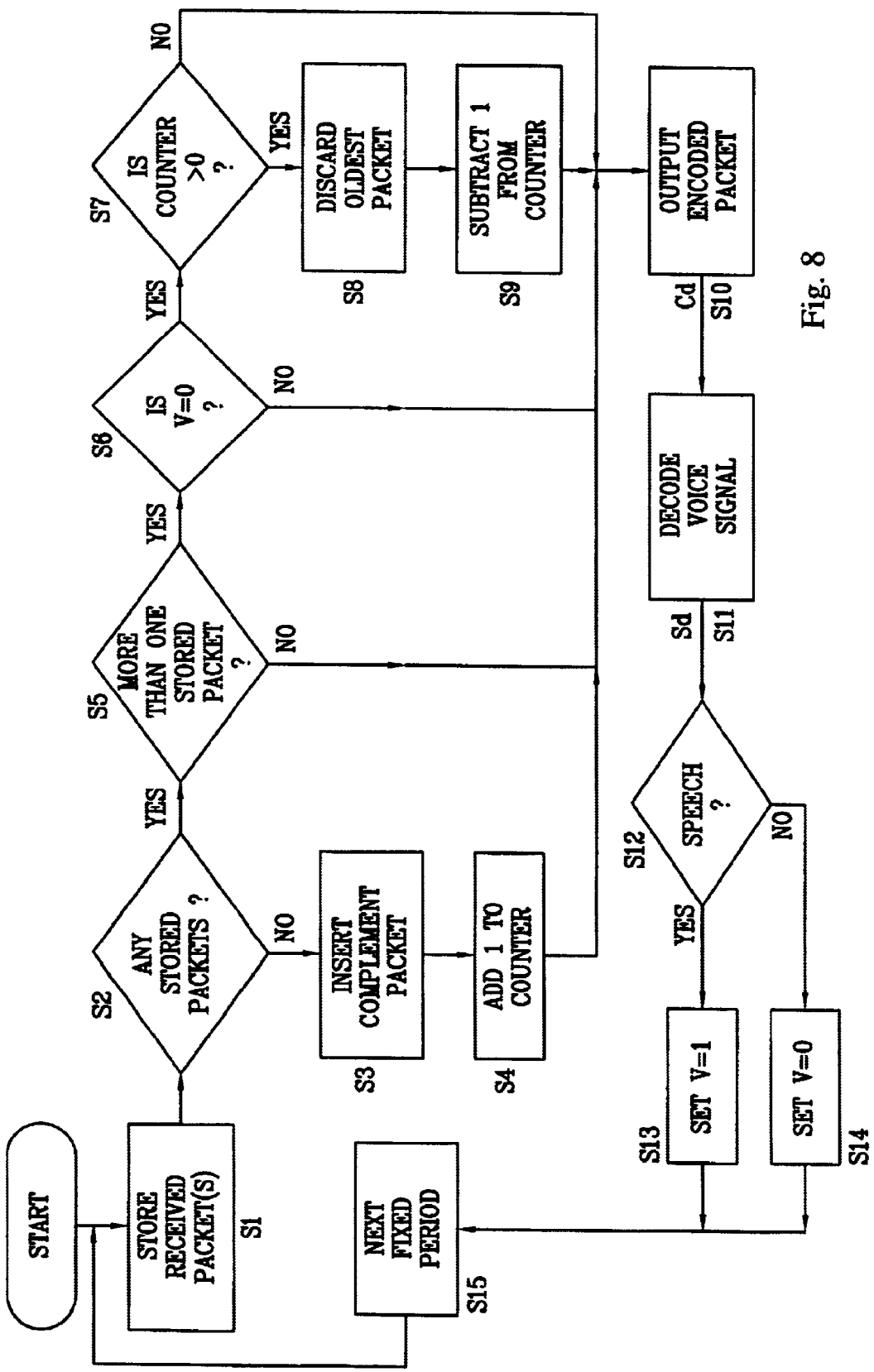
FIG. 8 is a flow chart of the first embodiment's receiving buffer control.

FIG. 8 is a detailed flowchart of the voice packet decoder's receiving buffer control for the first embodiment. The method begins at step S1 where packets received during an initial fixed period are stored in the receiving buffer. At step S2 the controller tests to determine if there are any stored packets in the buffer. If there are no stored packets, then at step S3 a complement packet is inserted into the buffer, and at step S4 a counter is incremented by one. At step S5 the controller determines whether there is more than one stored packet in the buffer. If there is only one stored packet, then it is output to the voice decoder at step S10. At step S6 the controller determines whether the speech/non-speech detecting result, V, for the preceding fixed period is 0 or 1. If 1, meaning that speech was detected, then the oldest packet in the buffer is output to the voice decoder at step S10. If, on the other hand, non-speech was detected, then the controller proceeds to step S7, in which the counter is examined to determine whether its value is greater than 0. If the counter is not greater than 0 then the oldest packet in the buffer is output to the voice decoder at step S10. If the counter is greater than 0, then the oldest packet is discarded at step S8, one is subtracted from the counter value at step S9, and the next oldest packet in the buffer is output to the voice decoder at step S10. At step S11, the voice signal represented by the encoded packet is decoded. Speech or non-speech is detected at step S12, and V is set to 1 at step S13 if speech is detected, or V is set 0 at step S14 if non-speech is detected. The process proceeds to the next fixed period at step S15 and returns to inputting receiving packets at step S1.

Figure 9:
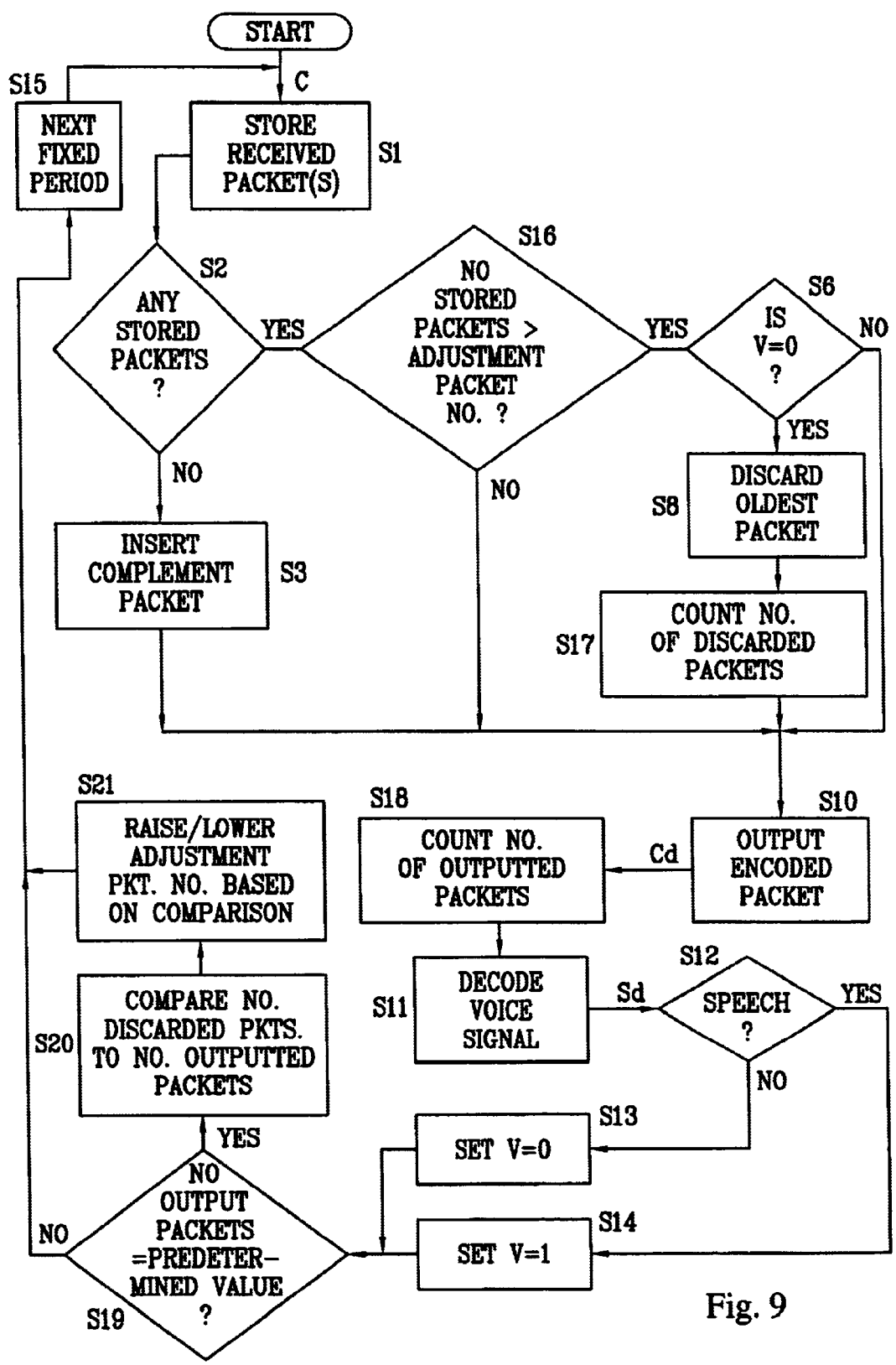
FIG. 9 is a flow chart of the fourth embodiment's receiving buffer control.

FIG. 9 is a detailed flowchart of the voice packet decoder's receiving buffer control for the fourth embodiment. Steps that are the same as those in FIG. 8 are referred to by the same designators. The method begins at step S1 where packets received during an initial fixed period are stored in the receiving buffer. At step S2 the controller tests to determine if there are any stored packets in the buffer. If there are no stored packets, then at step S3 a complement packet is inserted into the buffer, and at step S10 the complement packet is outputted to the voice decoder. At step S16 the controller determines whether the number of stored packets is greater than a predetermined adjustment packet number. If not, then the oldest stored packet is output to the voice decoder at step S10. If yes, then the process goes on to step S6, where the controller determines whether the speech/non-speech detecting result, V, for the preceding fixed period is 0 or 1. If 1, meaning that speech was detected, then the oldest packet in the buffer is output to the voice decoder at step S10. If, on the other hand, non-speech was detected, then the oldest packet is discarded at step S8, and the next oldest packet in the buffer is output to the voice decoder at step S10. In addition, the number of discarded packets is counted at step S17 and the number of outputted packets is counted at step S18. At step S1, the voice signal represented by the encoded packet outputted from the buffer is decoded. Speech or non-speech is detected at step S12, and V is set to 1 at step S13 if speech is detected, or V is set 0 at step S14 if non-speech is detected. At step S19, the counted number of outputted packets is compared to a predetermined value. If the number of outputted packets is greater than the predetermined value, then at step S20, the number of discarded packets is compared to the number of outputted packets. If the result of the comparison is above or below a predetermined threshold, then the adjustment packet number is raised or lowered accordingly at step S21. In either case, the process proceeds to the next fixed period at step S15 and returns to inputting receiving packets at step S1.

By using this embodiment, it is possible to select non-speech signals and discard them, so delays can be recovered without deterioration of voice-quality. Moreover, the operation of the embodiment tends to reduce the delays immediately. Then, it can suppress incongruity feeling with voice communication, which is caused by the delays.

(Second Embodiment)

Figure 3:
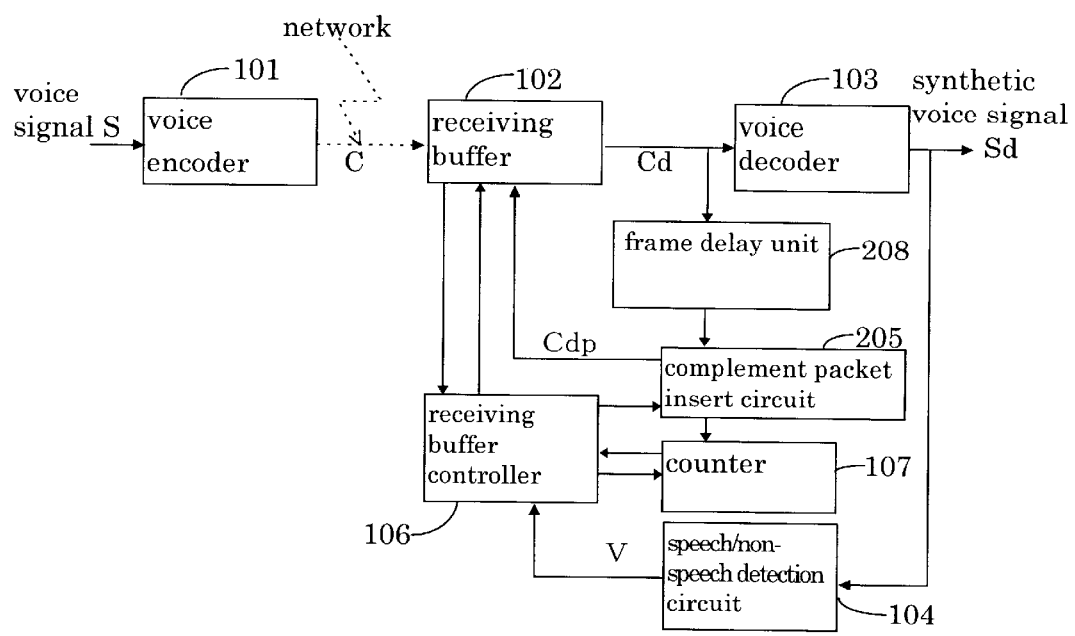
FIG. 3 is a block diagram of second embodiment of this invention.

FIG. 3 shows a construction of a voice packet decoder of the second embodiment. In the FIG. 3, some elements; a voice encoder 101, a receiving buffer 102, a voice decoder 103, a speech/non-speech detection circuit 104, a counter 107 and a receiving buffer controller 106, are operated the same as the first embodiment's, therefore, detailed descriptions of the elements are omitted.

Furthermore, the embodiment has a combination that a frame delay unit 208 provides output of the receiving buffer 102 for a complement packet insert circuit 205 with one frame delay.

Then, this voice packet decoder operates in the same way as the voice packet decoder of the first embodiment except for the following point.

If the receiving buffer 102 doesn't contain any encoded packets, the complement packet insert circuit 205 provides the receiving buffer 102 with the preceding period Cd which is outputted from the frame delay unit 208 as a complement packet Cdp.

In the first embodiment, the complement packet is inserted without consideration of voice signal's character, e.g., speech or non-speech.

On the other hand, this embodiment has a construction that an encoded packet of preceding period is used as a complement packet then the complement packet's character is the same as the encoded packet's of preceding period.

Therefore, where a complement packet is inserted the embodiment can support the continuity of the voice signal well. Particularly, a complement packet is inserted between speech period, the embodiment can decrease deterioration of voice-quality compared with the first embodiment.

(Third Embodiment)

Figure 4:
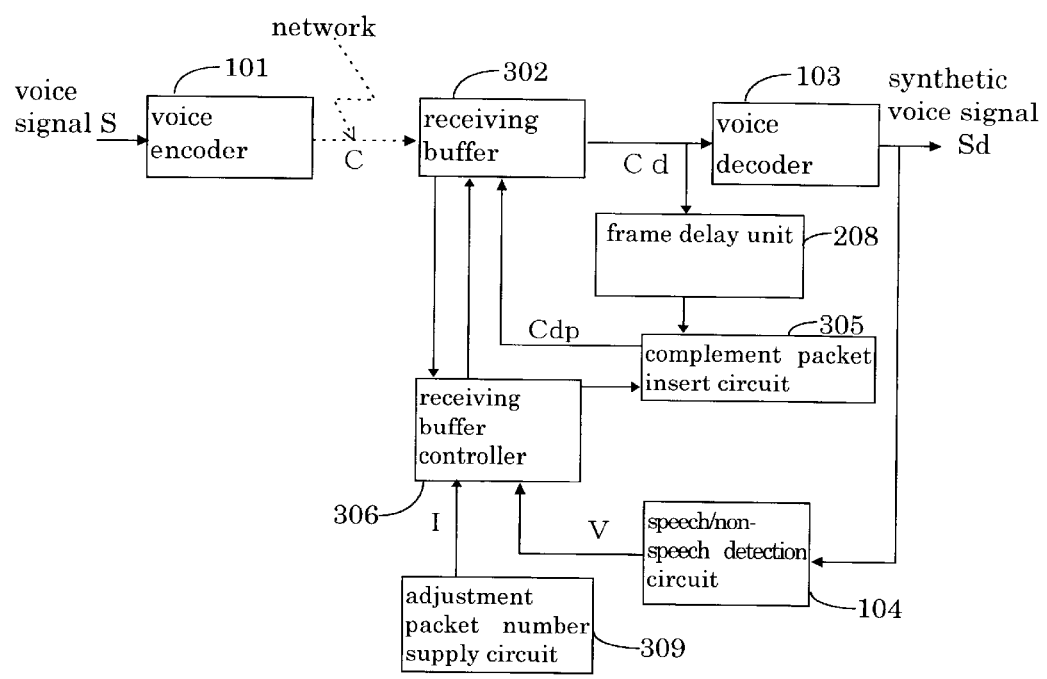
FIG. 4 is a block diagram of third embodiment of this invention.

FIG. 4 shows a construction of a voice packet decoder of the third embodiment.

The voice packet decoder doesn't have any counters which is equivalent to the first and second embodiments' counters. Instead, a receiving buffer 302 provides encoded packet number for a receiving buffer control circuit 306. Furthermore, an adjustment packet number supply circuit 309 connects to the receiving buffer control circuit 306.

The receiving buffer 302 operates in the same way as the first embodiment in the point that the oldest stored packet C is output into the voice decoder 103 as an encoded packet Cd at regular interval 10 ms.

And in the FIG. 4, some elements; a voice encoder 101, a receiving butler 102, a voice decoder 103 and a speech/non-speech detection circuit 104 are operated the same as the first embodiment's. Furthermore, an frame delay unit 208 operates the same as the second embodiment's, therefore, detailed description of these elements are omitted.

The voice packet decoder of this third embodiment operates as follows by using encoded packets C that they are received from the network.

The encoded packets C that were received from the network are stored in the receiving buffer 302 in the order of arrival.

The receiving buffer 302 outputs stored encoded packets C as Cd in order of old in every constant periodic 10 ms.

If the encoded packet doesn't exist in the receiving buffer 302 because of the delay of the network and so on, a complement packet insert circuit 305 inserts a complement packet.

Then, if stored encoded packet number in the receiving buffer 302 is larger than an adjustment packet number I which is provided from an adjustment packet number supply circuit 309, and the preceding period detection of the speech/non-speech detection circuit 104 was "V=0" or a non-speech signal, then the receiving buffer control circuit 306 discards the oldest stored encoded packet C. And, the adjustment packet number I is set up in 3 with this embodiment.

Figure 5:
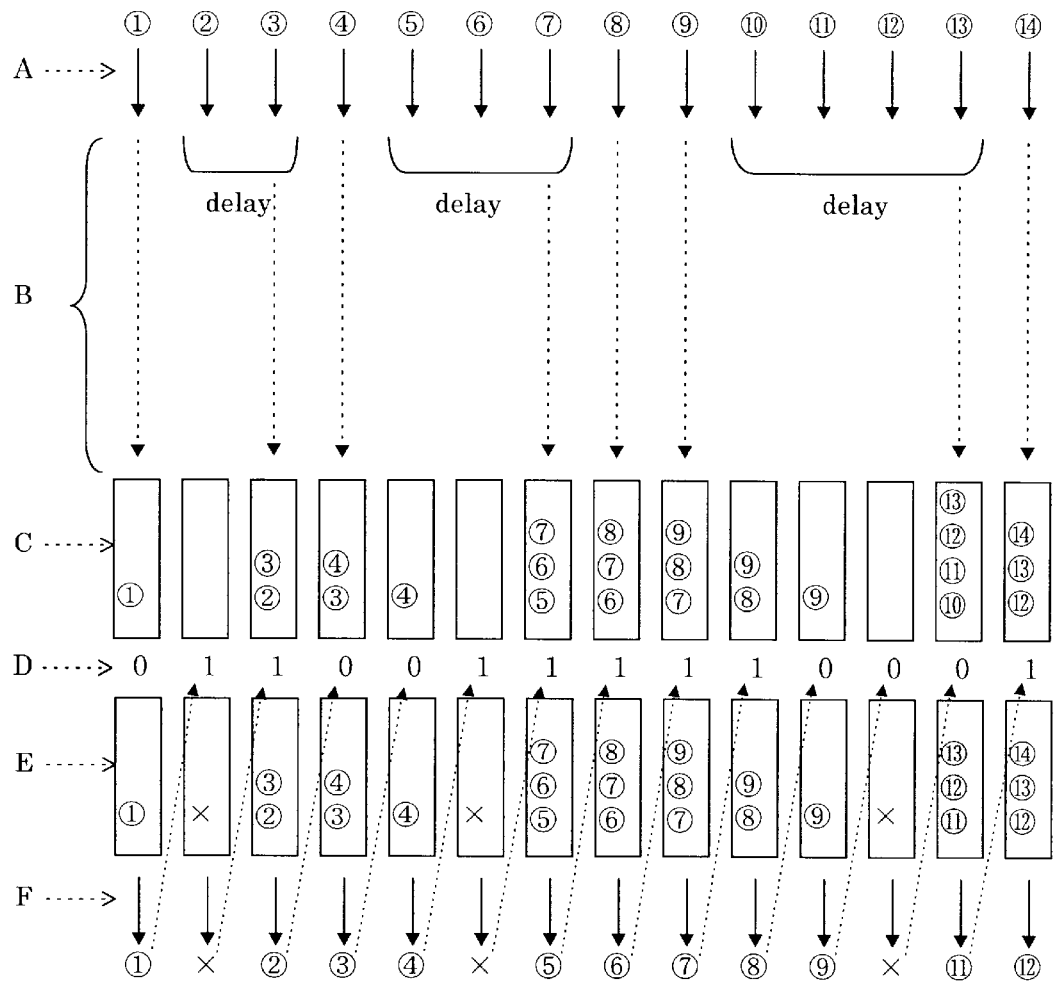
FIG. 5 is an operation chart of the third embodiment's receiving buffer control.

FIG. 5 is a detailed operation chart of the voice packet decoder's receiving buffer control.

Encoded packets (1), (2), (3), . . . are transmitted from the voice encoder 101 to the voice packet decoder through the network and stored in the receiving buffer 302 in the order of arrival.

In normal condition, the encoded packets are transmitted in the constant interval of 10 ms. But, some reasons may occur transmission delay of any encoded packet.

For example, the delay of 10 ms occurs on the transmission of the encoded packet (2) (:see section B and C). In this case, the complement packet insert circuit 305 inserts a complement packet "X" (:see section E). Then, the complement packet "X" is provided to the voice decoder 103 (:see section F).

When the encoded packet (2) and (3) transmitted and stored in the receiving buffer 102, the number of the stored encoded packets is two and because it doesn't reach adjustment packet number I (=3), the receiving buffer controller 306 doesn't perform the discarding of a packet.

Then, when delay occurs on the transmission of the encoded packet (5), not a complement packet "X" but the encoded packet (4) is outputted.

When the encoded packet (13) is transmitted, the discarding of a packet is performed for the first time, because, the number of the stored encoded packets is made four or it's larger than the adjustment packet number 1, and the value of the preceding 10 ms period detection is "V=0" or non-speech signal.

In some networks, the delays of the packet transmission may be happened frequently. In this case, if the delay recovery operation is always performed like the first embodiment, then the operations of the inserting a complement packet and the discarding a stored encoded packet are performed frequently. Therefore, quality of the synthetic voice signal is deteriorated rather than improved.

In contrast, the embodiment can be selected a proper adjustment packet number which is determined based on a research of a distribution on the network delay. Therefore, the above frequent operations of the inserting and the discarding aren't performed, so the embodiment can suppress the above deterioration of the synthetic voice signal quality.

(Fourth Embodiment)

Figure 6:
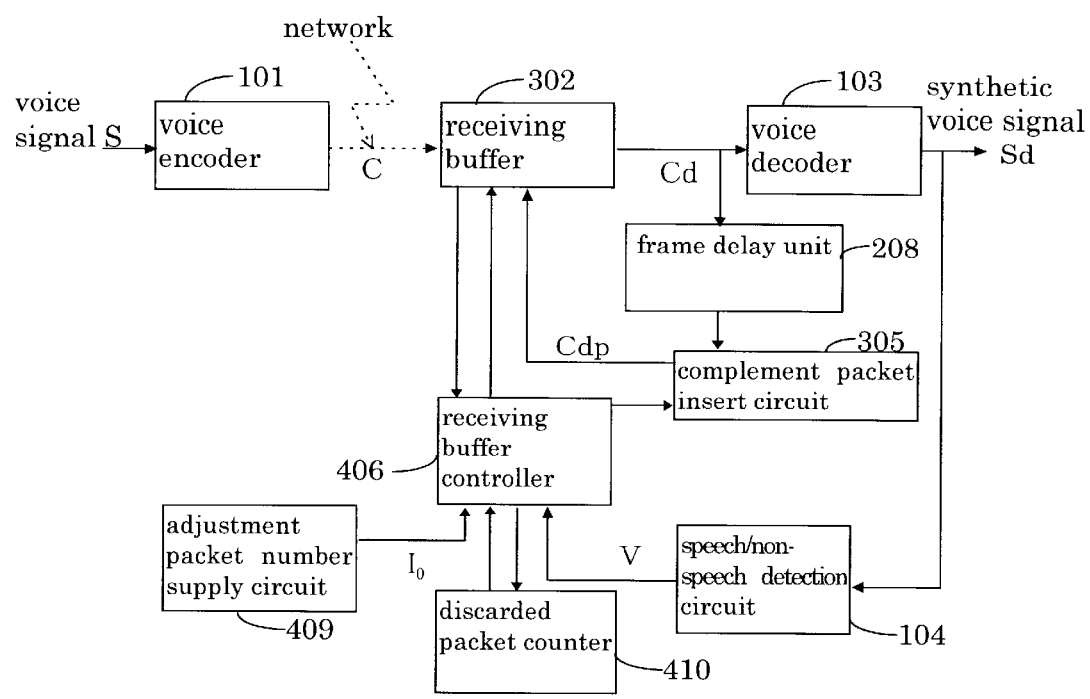
FIG. 6 is a block diagram of fourth embodiment of this invention.

FIG. 6 shows a construction of a voice packet decoder of the fourth embodiment.

In the FIG. 6, a receiving buffer controller 406 of the voice packet decoder is connected to an adjustment packet number supply circuit 409 and a discarded packet counter 410, instead of the adjustment packet number supply circuit 309.

The adjustment packet number supply circuit 409 provides an initial value $I_0$ of an adjustment packet number I, and the discarded packet counter 410 counts a number of the packet discarding against a predetermined number of the outputted encoded packets. In this point, the receiving buffer controller 406 is different from the receiving buffer controller 306 of the third embodiment.

First, the initial value $I_0$ of the adjustment packet number I is provided by the adjustment packet number supply circuit 409.

After the voice packet decoder starts a operation, the receiving buffer controller 406 changes the adjustment packet number I adaptively, based on the number of the packet discarding which is provided by the discarded packet counter 410.

Moreover, other elements of the FIG. 6 are operated the same as the third embodiment's. Therefore, only the operation of the receiving buffer controller 406 is described as follows and the others descriptions are omitted.

On the voice packet decoder, about the changing the adjustment packet number I, the receiving buffer controller 403 performs following operations for changing the adjustment packet number I every 100 frames adaptively. Furthermore, in the embodiment 1 frame correspond to the fixed period 10 ms, so the "every 100 frames" means "every 1s".

In every 100 frames, the discarded packet counter 410 counts a number of packet discarding. If the number of packet discarding is larger than predetermined discarded packet number P, then the receiving buffer controller 403 adds one to current adjustment packet number I. And if not, the receiving buffer controller 403 subtracts one from the current adjustment packet number I. When a result of the above operations make the adjustment packet number I smaller then the initial value $I_0$, then the adjustment packet number I is made $I=I_0$.

Excepting the above process, the receiving buffer control circuit 406 operates the same as the receiving buffer control circuit 306 of the third embodiment. Then, the embodiment can obtain the same merit as the third embodiment even when a distribution of a network delay can't be researched in advance.

(Fifth Embodiment)

Figure 7:
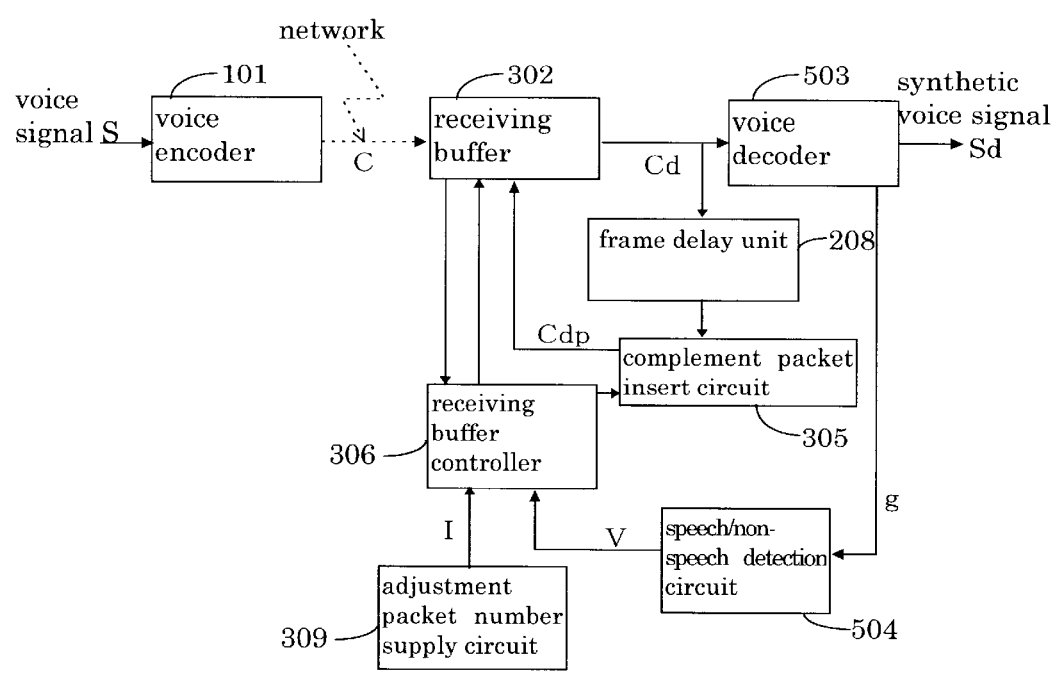
FIG. 7 is a block diagram of fifth embodiment of this invention.

FIG. 7 shows a construction of a voice packet decoder of the fifth embodiment.

In the FIG. 7, except a voice decoder 503 and a speech/non-speech detection circuit 504, all elements are operated the same as equivalent elements of the third embodiment, therefore, detailed descriptions about the operations are omitted.

On the fifth embodiment, the voice decoder 503 generates a synthetic voice signal Sd by decoding an encoded packet Cd every 10 ms. Furthermore, the voice decoder 503 outputs a gain g of the synthetic voice signal Sd into the speech/non-speech detection circuit 504.

On the speech/non-speech detection circuit 504, if the gain g satisfies following expression (2), the speech/non-speech detection circuit 504 determines the synthetic voice signal Sd is speech signal and outputs "V=1". The contrary if not, the speech/non-speech detection circuit 504 determines the synthetic voice signal Sd is non-speech signal and outputs "V=0".

$$g > Tg \qquad (2)$$

where Tg denotes a predetermined constant of speech gain threshold and in the embodiment determined as 0.5.

Adapting the above method, a speech/non-speech detection process of the embodiment can be simplified rather than the process of the third embodiment.

Regarding a basic concept of the packet discarding, components of the fifth embodiment is the same as the third embodiment's, excepting the above speech/non-speech detection process. Furthermore, the above speech/non-speech detection process can be applied to the other embodiments'.

By using this embodiment, when delays are happened on a voice communication, the delays can be recovered without deterioration of voice-quality.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for controlling a receiving buffer which provides encoded voice packets for a voice decoder, the method comprising:

storing a plurality of receiving packets from a network in a receiving buffer;

in every one of a sequence of fixed periods, outputting one of the receiving packets in the receiving buffer to the voice decoder as an encoded packet;

in any fixed period, if no receiving packets are stored in the receiving buffer, inserting a predetermined complement packet in the receiving buffer and adding one to a counter value, the complement packet being output as the encoding packet;

detecting whether a synthetic voice signal which is generated by the voice decoder is speech signal or non-speech signal;

if a result of the speech/non-speech detecting is non-speech for the preceding fixed period, the counter value is more than zero, and a number of receiving packets stored in the receiving buffer is more than one, then discarding the oldest packet stored in the receiving buffer and subtracting one from the counter value, the next oldest packet stored in the receiving buffer being output as the encoding packet; and if the result of the speech/non-speech detecting is speech for the preceding fixed period, or the counter value is zero, or the number of receiving packets stored in the receiving buffer is one, then the oldest receiving packet stored in the receiving buffer is output as the encoding packet.

2. The method of claim 1, wherein the complement packet is the same as the encoded packet which is output in the preceding fixed period.

3. A method for controlling a receiving buffer which provides encoded voice packets for a voice decoder, the method comprising:

storing a plurality of receiving packets from a network in a receiving buffer as encoded packets;

in every one of a sequence of fixed periods, outputting one of the encoding packets in the receiving buffer to the voice decoder;

in any fixed period, if no receiving packets are stored in the receiving buffer, inserting a predetermined complement packet in the receiving buffer, the complement packet being the one outputted encoded packet;

detecting whether a synthetic voice signal which is generated by the voice decoder is speech signal or non-speech signal;

if a result of the speech/non-speech detecting is non-speech for the preceding fixed period, and a number of receiving packets stored in the receiving buffer is larger than a predetermined adjustment packet number, then discarding the oldest packet stored in the receiving buffer, the next oldest packet in the receiving buffer being the one outputted encoded packet; and if a result of the speech/non-speech detecting is speech for the fixed period preceding the one fixed period, or the number of receiving packets stored in the receiving buffer is not larger than the predetermined adjustment packet number, then the oldest packet in the receiving buffer is the one outputted encoded packet.

4. The method of claim 3, further comprising:

providing an initial value of the adjustment packet number;

counting a number of the discarded encoded packets against a predetermined number of the outputted encoded packets;

comparing the number of the discarded encoded packets with a predetermined discarded packet number each time the predetermined number of the encoded packets is outputted; and if the number of the discarded encoded packets is larger than the predetermined discarded packet number, then increasing the adjustment packet number, and if not, decreasing the adjustment packet number.

5. The method of claim 3, wherein the complement packet is the same as the encoded packet which is output in the preceding fixed period.

6. A voice packet decoder, comprising:

a receiving buffer for storing a plurality of receiving packets received from a network and outputting one of the stored receiving packets as an encoded packet in each one of a sequence of fixed periods;

a complement packet insert circuit for inserting a predetermined complement packet in the receiving buffer, if, in any fixed period, no receiving packets are stored in the receiving buffer;

a counter to which one is added when the complement packet insert circuit inserts the predetermined complement packet;

a voice decoder for generating a synthetic voice signal based on the encoded packet;

a speech/non-speech detection circuit for detecting whether the synthetic voice signal is speech signal or non-speech signal; and a receiving buffer controller for (1) discarding the oldest packet stored in the receiving buffer, causing the receiving buffer to output the next oldest packet and subtracting one from the counter's value, when a result of the speech/non-speech detecting is non-speech, the counter's value is more than zero, and a number of the receiving packets stored in the receiving buffer is more than one; (2) causing the receiving buffer to output the oldest packet when the result of the speech/non-speech detecting is speech, or the counter's value is zero, or the number of receiving packets stored in the receiving buffer is one; and (3) causing the receiving buffer to output the complement packet when no receiving packets are stored in the receiving buffer.

7. The voice packet decoder of claim 6, wherein the complement packet is the same as the encoded packet which is output in the preceding fixed period.

8. A voice packet decoder, comprising:

a receiving buffer for storing a plurality of receiving packets received from a network and outputting one of the stored receiving packets as an encoded packet in each one of a sequence of fixed periods;

a complement packet insert circuit for inserting a predetermined complement packet in the receiving buffer, if, in any fixed period, no receiving packets are stored in the receiving buffer;

a voice decoder for generating a synthetic voice signal based on the encoded packet;

a speech/non-speech detection circuit for detecting whether the synthetic voice signal is speech signal or non-speech signal; and a receiving buffer controller for (1) discarding the oldest packet stored in the receiving buffer and causing the receiving buffer to output the next oldest packet, when a result of the speech/non-speech detecting is non-speech, and a number of the receiving packets stored in the receiving buffer is larger than a predetermined adjustment packet number; (2) causing the receiving buffer to output the oldest packet when the result of the speech/non-speech detecting is speech or the number of the number of the receiving packets stored in the receiving buffer is not larger than the predetermined adjustment packet number; and (3) causing the receiving buffer to output the complement packet when no receiving packets are stored in the receiving buffer.

9. The voice packet decoder of claim 8, further comprising:

an initial value providing circuit for providing an initial value of the adjustment packet number; and a discarded packet counter for counting a number of the discarded packets against a predetermined number of the outputted encoded packets;

wherein the receiving buffer controller is further capable of comparing the number of the discarded packets with a predetermined discarded packet number each time the predetermined number of the encoded packets is outputted and, if the number of the discarded packets is larger than the predetermined discarded packet number, then increasing the adjustment packet number, and if not, decreasing the adjustment packet number.

10. The voice packet decoder of claim 8, wherein the complement packet is the same as the encoded packet which is output in the preceding fixed period.

* * * * *